(12) United States Patent
Dean

(10) Patent No.: US 12,728,452 B2
(45) **Date of Patent: *Sep. 8, 2026**

(54) SYSTEM AND METHOD FOR REMEDIATING SOIL

(71) Applicant: MAD-ERA, Inc., Midland, TX (US)

(72) Inventor: Jack Dean, Midland, TX (US)

(73) Assignee: MAD-Era, Inc., Midland, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 18/426,789

(22) Filed: Jan. 30, 2024

(65) Prior Publication Data

US 2024/0383023 A1 Nov. 21, 2024

Related U.S. Application Data

(63) Continuation of application No. 18/197,431, filed on May 15, 2023, now Pat. No. 11,919,057.

(51) Int. Cl.
*B09C 1/02* (2006.01)
*B01D 21/26* (2006.01)

(52) U.S. Cl.
CPC .............. *B09C 1/02* (2013.01); *B01D 21/265* (2013.01)

(58) Field of Classification Search
CPC ... B09C 1/02; B01D 21/265; B01F 23/23121; B01F 25/10
See application file for complete search history.

(56) References Cited

U.S. PATENT DOCUMENTS 6,207,055 B1 * 3/2001 Satterfield ................. B09C 1/10 210/616
2017/0333961 A1 11/2017 Song

FOREIGN PATENT DOCUMENTS

JP H09271784 A 10/1997
JP 2012106158 A 6/2012
KR 101300206 B1 8/2013
KR 101841958 3/2018

* cited by examiner

*Primary Examiner* — Carib A Oquendo
(74) *Attorney, Agent, or Firm* — Hall Estill Law Firm

(57) ABSTRACT

A method of feeding a contaminated soil to a remediation apparatus to generate a clean soil and mixing the contaminated soil with an aqueous cleaning solution to generate a soil solution. The method also includes subjecting the soil solution to vortical flow in a first direction and subjecting the soil solution to vortical flow in a second direction in an opposite lateral direction from the first direction. The clean soil can then be separated from a dirty aqueous solution. A remediation apparatus used to clean the contaminated soil that includes a chamber having a soil inlet for receiving a contaminated soil and a soil outlet. The chamber is angled downward from the soil inlet to the soil outlet to facilitate the flow of the soil solution through the chamber. The remediation apparatus also includes a first set of nozzles to inject an aqueous cleaning solution to create a first vortical flow zone in the chamber in a first direction and a second set of nozzles to inject the aqueous cleaning solution to create a second vortical flow zone in the chamber in the second direction.

20 Claims, 6 Drawing Sheets

SYSTEM AND METHOD FOR REMEDIATING SOIL

CROSS-REFERENCE TO RELATED APPLICATIONS

The present application is a continuation of U.S. patent application having U.S. Ser. No. 18/197,431, filed May 15, 2023, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a remediation apparatus and method for cleaning soil that have been environmentally impacted.

2. Description of the Related Art

Soil can be contaminated in a variety of ways. In oil and gas operations, soil can be contaminated from the handling of oilfield waste products or from everyday production of the oil and gas well. Contaminated soils can have high chloride levels or contain oil from a spill that have to be removed. Currently, there are numerous systems and methods used to clean soil, but most of them require harsh chemicals or a very complicated process.

Accordingly, there is a need for a remediation apparatus and process for cleaning contaminated soil in an environmentally friendly and efficient manner.

SUMMARY OF THE DISCLOSURE

The present disclosure is directed to a method of remediating soil. The method includes feeding a contaminated soil to a remediation apparatus to generate a clean soil and mixing the contaminated soil with an aqueous cleaning solution to generate a soil solution. The method also includes subjecting the soil solution to vortical flow in a first direction and subjecting the soil solution to vortical flow in a second direction in an opposite lateral direction from the first direction. The clean soil can then be separated from a dirty aqueous solution.

The present disclosure can also be directed to a remediation apparatus used to clean the contaminated soil. The apparatus includes a chamber having a soil inlet for receiving a contaminated soil and a soil outlet. The chamber is angled downward from the soil inlet to the soil outlet to facilitate the flow of the soil solution through the chamber. The remediation apparatus also includes a first set of nozzles to inject an aqueous cleaning solution to create a first vortical flow zone in the chamber in a first direction and a second set of nozzles to inject the aqueous cleaning solution to create a second vortical flow zone in the chamber in the second direction.

DETAILED DESCRIPTION OF THE DISCLOSURE

Figure 1:
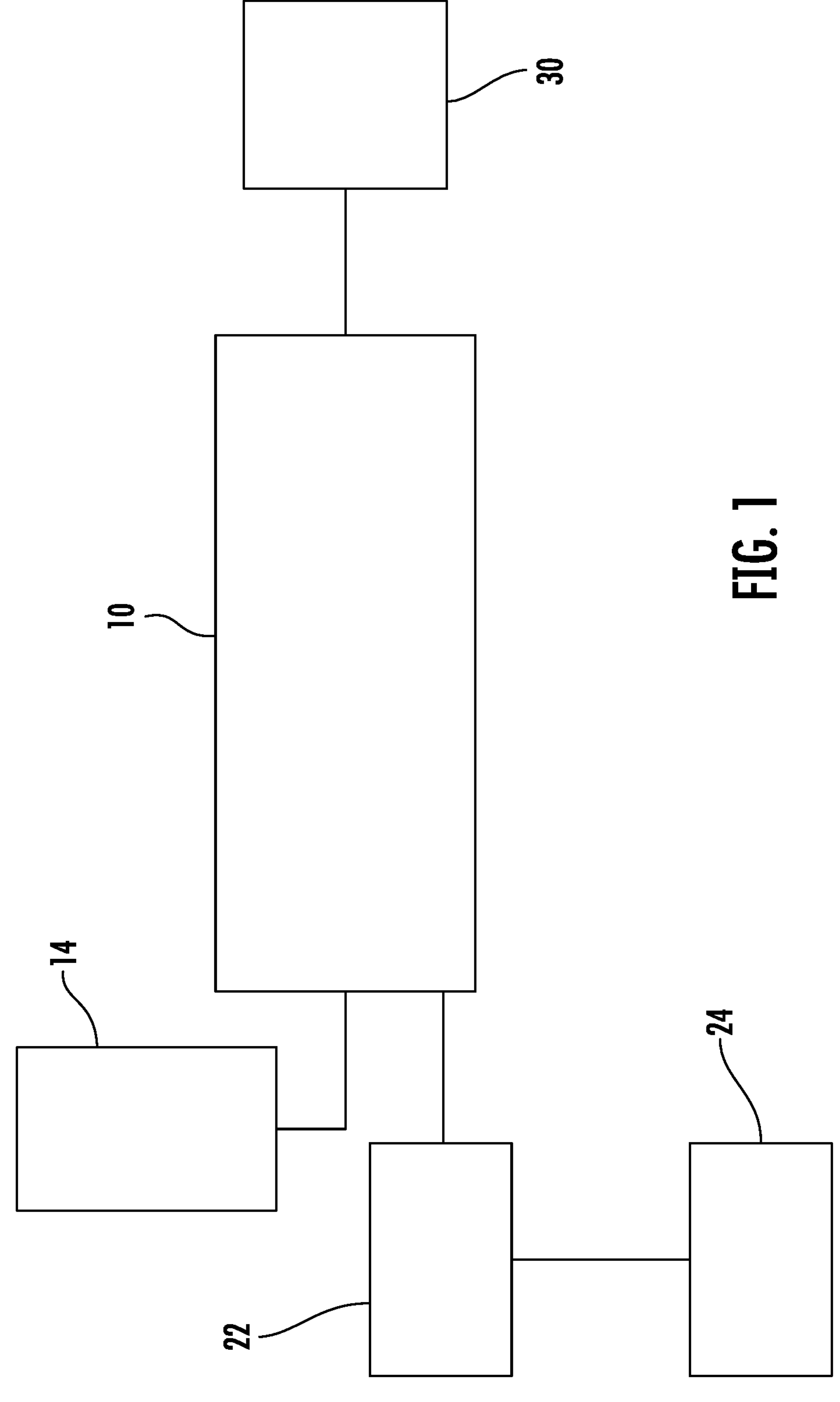
FIG. 1 is a schematic view of a system incorporating a remediation apparatus constructed in accordance with the present disclosure.
Figures 2A, 2B:
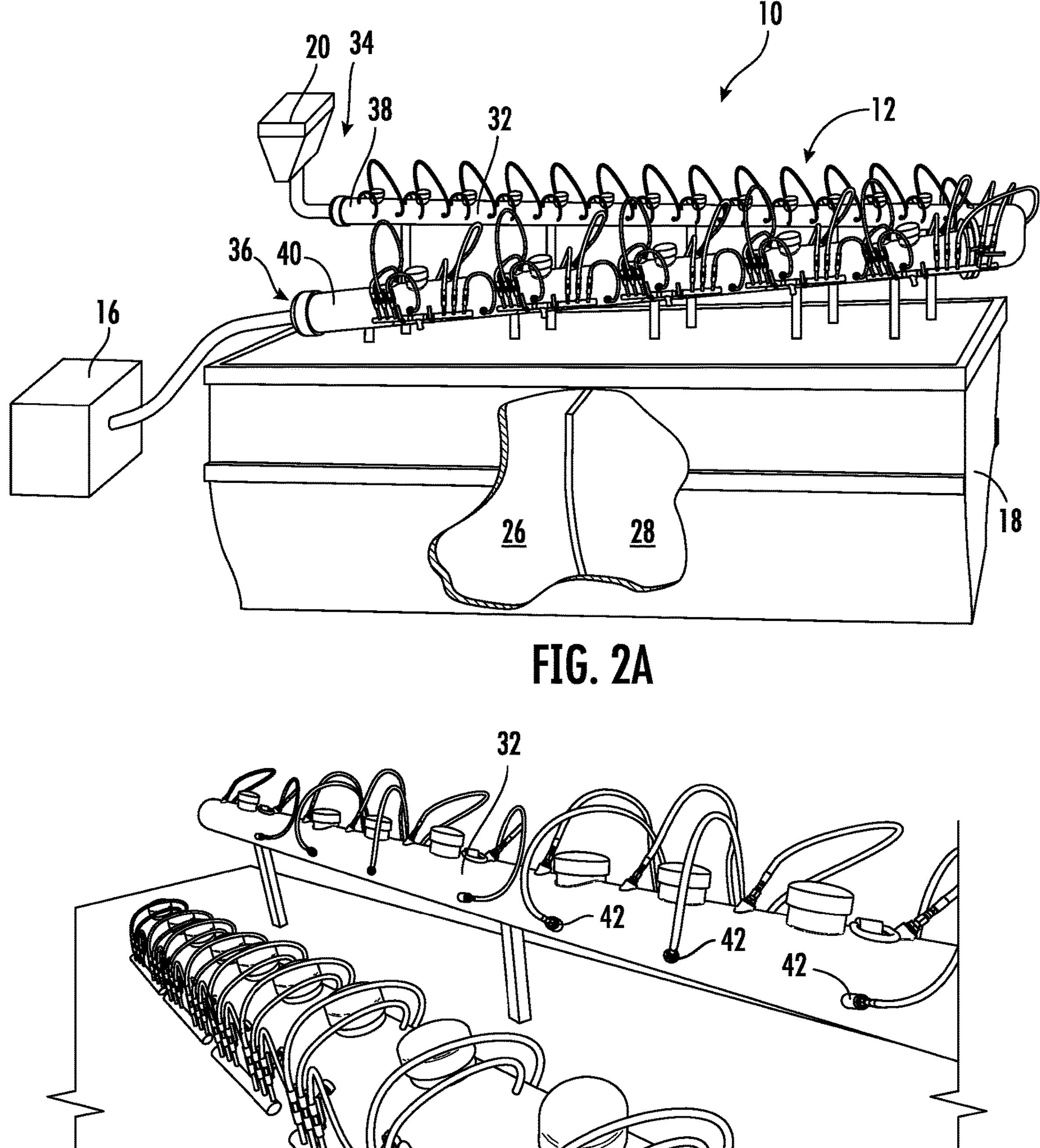
FIG. 2A is a perspective of the remediation apparatus constructed in accordance with the present disclosure.
FIG. 2B is a perspective view of a portion of the remediation apparatus constructed in accordance with the present disclosure.
Figure 3:
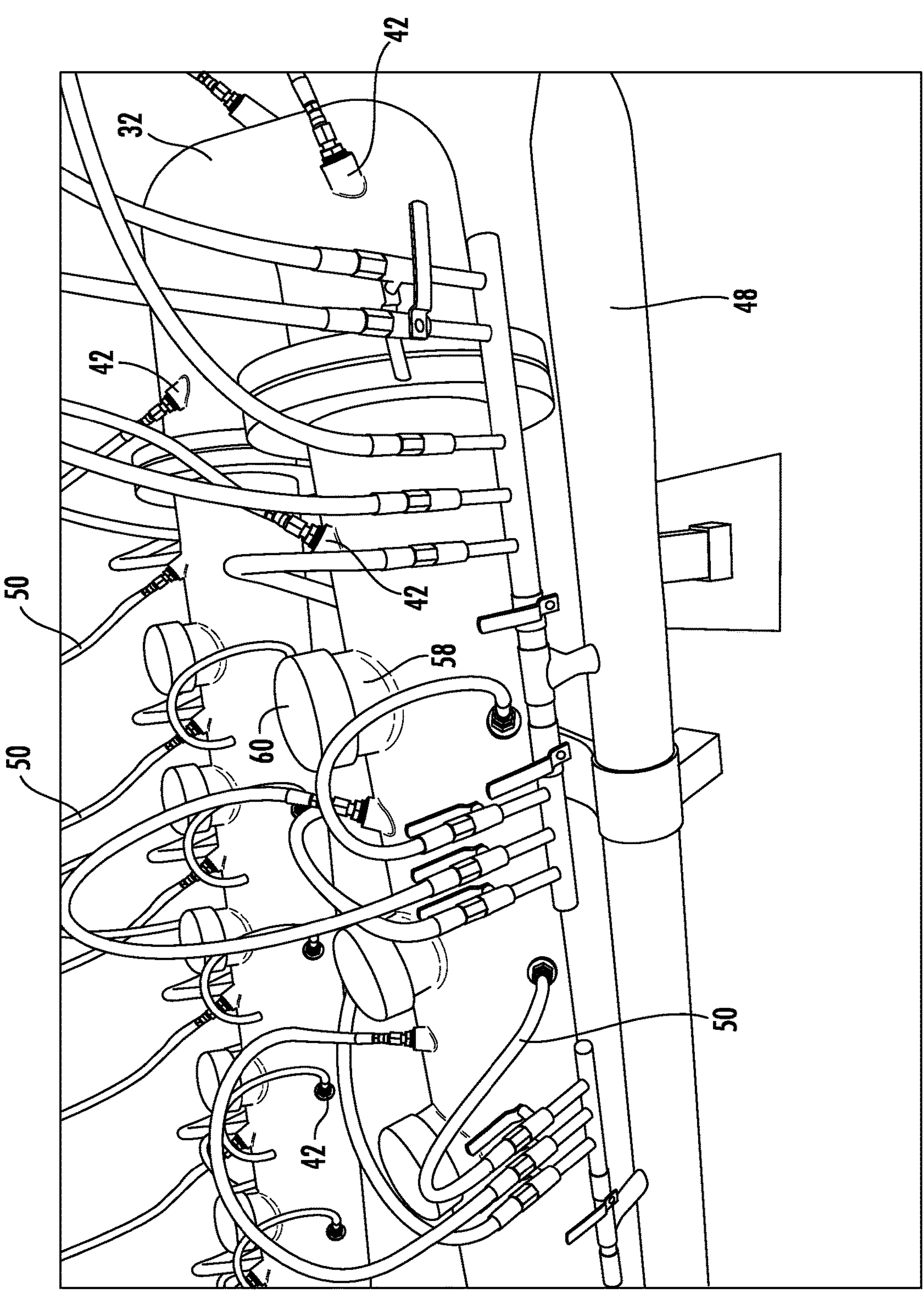
FIG. 3 is a perspective view of another portion of the remediation apparatus constructed in accordance with the present disclosure.
Figure 4:
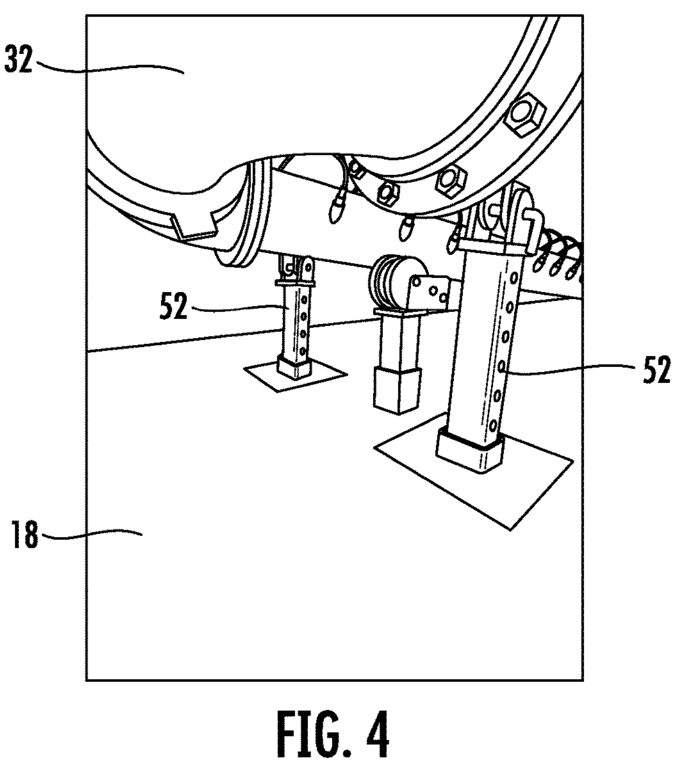
FIG. 4 is a perspective view of yet another portion of the remediation apparatus constructed in accordance with the present disclosure.

Referring now to the FIGS. 1-6B, the present disclosure is directed to a remediation apparatus 10 for cleaning contaminated soils. Contaminated soils can include oil and/or have a chloride level that is above a certain threshold. The contaminated soils are converted to a soil solution in the remediation apparatus 10 by combining the contaminated soil with an aqueous cleaning solution. The aqueous cleaning solution can be any aqueous solution capable of cleaning the contaminated soils to a desired cleanliness. The remediation apparatus 10 can include a cleaning section 12 where the soil solution can be subject to alternating turbulent flow areas, a feeder section 14 where the contaminated soil is fed to the cleaning section 12, a separation section 16 where clean soil can be separated from the dirty aqueous solution created by the cleaning section 12 and a tank section 18 to hold the cleaning aqueous solution and/or the dirty aqueous solution.

The feeder section 14 can include any components necessary to be able to feed the contaminated soil to the cleaning section 12. For example, the feeder section 14 can include a hopper 20 for holding and funneling the contaminated soil to the cleaning section 12. The separation section 16 can include any number of components and apparatuses capable of separating the clean soil from the dirty aqueous solution exiting the cleaning section 12. For example, the separation section 16 can include a shale shaker 22 for separating larger chunks of clean soil from the soil solution and a centrifuge 24 for separating the remaining clean soil from the dirty aqueous solution. The dirty aqueous solution can be sent to various places depending on the desires of the operators of the remediation apparatus 10. Similarly, the clean soil can then be used for any desired purpose.

The tank section 18 can be designed in numerous ways depending on how the remediation apparatus 10 is set up and the preferences of the operators of the remediation apparatus 10. The tank section 18 can be used solely to store the dirty aqueous solution separated from the clean soil. The tank section can have a first compartment 26 for holding the dirty aqueous solution separated from the clean soil and a second compartment 28 for holding aqueous cleaning solution to be pumped into the cleaning section 12. The dirty aqueous solution deposited in the first compartment 26 can naturally separate into three layers. Any solids will settle into a solid layer at the bottom of the first compartment 26, any oil based fluids will settle in a top oil layer and a primarily aqueous layer will be present between the solid layer and the top oil layer. The primarily aqueous layer can be withdrawn from the first compartment 26 and sent to a desalination unit 30 to lower the chloride levels in the fluid from the primarily aqueous layer. After the fluid from the primarily aqueous layer has passed through the desalination unit 30, it can be sent to the second compartment 28 of the tank section 18. In another embodiment, the fluid taken from the desalination unit 30 can be taken and used in any process or for any purpose desirable.

The cleaning section 12 includes a chamber 32 with a soil inlet 34 for receiving the contaminated soil and a soil outlet 36 for discharging the soil solution from the chamber 32. The chamber 32 can be a cylindrically shaped tube that slants downward from an inlet end 38 to an outlet end 40 to permit the soil solution to move toward the outlet end 40 from the inlet end 38 of the chamber 32. The chamber 32 is not limited to traveling in only a single direction. For example, the chamber 32 can have multiple turns therein, which would permit the inlet end 38 and the outlet end 40 of the chamber 32 to be positioned in any desired areas of the remediation apparatus 10. The chamber 32 can be slanted any number of degrees such that proper cleaning of the contaminated soil by the remediation apparatus 10 occurs. In one embodiment, the chamber 32 is slanted between about 3 and 8 degrees. In another embodiment, the chamber 32 is slanted between about 3 and 6 degrees. In yet another embodiment, the chamber 32 is slanted between about 3.5 and 4.5 degrees. To achieve the desired vertical drop per linear unit of measurement or slanting of the chamber 32, the remediation apparatus 10 can include an adjustable legs 52 that can be manipulated to provide the desired vertical drop per linear unit of measurement or slanting of the chamber 32.

The remediation apparatus 10 can include numerous vortical flow zones wherein the soil solution is caused to undergo a specific vortical flow direction in each vortical flow zone. The remediation apparatus 10 can be designed such that the direction of the vortical flow in each adjacent vortical flow zone is in a different direction or an opposite direction. Turbulent zones are created in the chamber 32 as the soil solution is forced to stop flowing vortically in one direction and forced to start flowing vortically in another direction. The vortical flow can be caused by nozzles 42 supported by the chamber 32 that direct the aqueous cleaning solution into the chamber 32 in directions to cause the desired vortical flow. To cause the vortical flow, the nozzles 42 are set such that the aqueous cleaning solution is forced in the downward direction of the chamber 32 and some degree of clockwise or counterclockwise positioning relative to the circumference of the chamber 32 at a particular spot along the chamber's length. The aqueous cleaning solution injected into the chamber 32 is combined with the contaminated soil and/or the soil solution to generate the soil solution or add to the soil solution depending on position of the nozzle 42 the aqueous cleaning solution is being injected through.

In one embodiment, the remediation apparatus 10 includes a first group of nozzles **42*a* that cause the soil solution to have a vortical flow in a first direction in the chamber 32 and a second group of nozzles 42*b* that cause the soil solution to have a vortical flow in a second direction in the chamber 32. In this embodiment, each nozzle 42 of first group of nozzles 42*a* can be alternated down a length of the chamber 32 with the nozzles of the second group of nozzles 42*b*. Therefore, each vortical flow zone would have a single nozzle 42. The nozzles 42 can be positioned tangentially to an inner surface of the chamber 32 to cause the vortical flow. The nozzles 42 can be supported on any part of the circumference of the chamber 32 to cause the vortical flow. For example, the nozzles 42 can be disposed on the sides, the top or the bottom of the chamber 32. It should be understood and appreciated that each nozzle 42 can include the necessary components, such as pumps, valves, hoses, etc., to have the aqueous cleaning solution delivered to the nozzles 42 at the desired pressure. For example, the aqueous cleaning solution can be delivered to the nozzles 42 via a delivery pipe 48 and hoses 50**.

In a further embodiment of the present disclosure, each vortical flow zone could have multiple nozzles 42 injecting the aqueous cleaning solution into the chamber to cause the desired vortical flow of the particular vortical flow zone. In one exemplary embodiment, each vortical flow zone could have a nozzle disposed on either side part 44 of the chamber 32 and/or on an upper side 46 of the chamber 32.

The remediation apparatus 10 can have any number of vortical flow zones desirable such that the contaminated soil can be remediated to a desired level. The remediation apparatus 10 can be designed to have a certain number of vortical flow zones per unit of length of the chamber 32. The remediation apparatus 10 can include from about 25 to about 100 vortical flow zones per 100 feet of length of the chamber 32. In a further embodiment, the remediation apparatus 10 can include from about 35 to about 80 vortical flow zones per 100 feet of length of the chamber 32. In yet another embodiment, the remediation apparatus 10 can include from about 50 to about 70 vortical flow zones per 100 feet of length of the chamber 32.

The remediation apparatus 10 can also include a certain amount of linear distance of the chamber 32 between nozzles 42. In one embodiment, the remediation apparatus 10 can include nozzles 42 spaced one to eight inches apart. In another embodiment, the nozzles 42 can be spaced 4 to 6 inches apart. In yet another embodiment, the remediation apparatus 10 could include 3 or 4 nozzles 42 per 18 inches of linear footage of the chamber 32.

Figure 5:
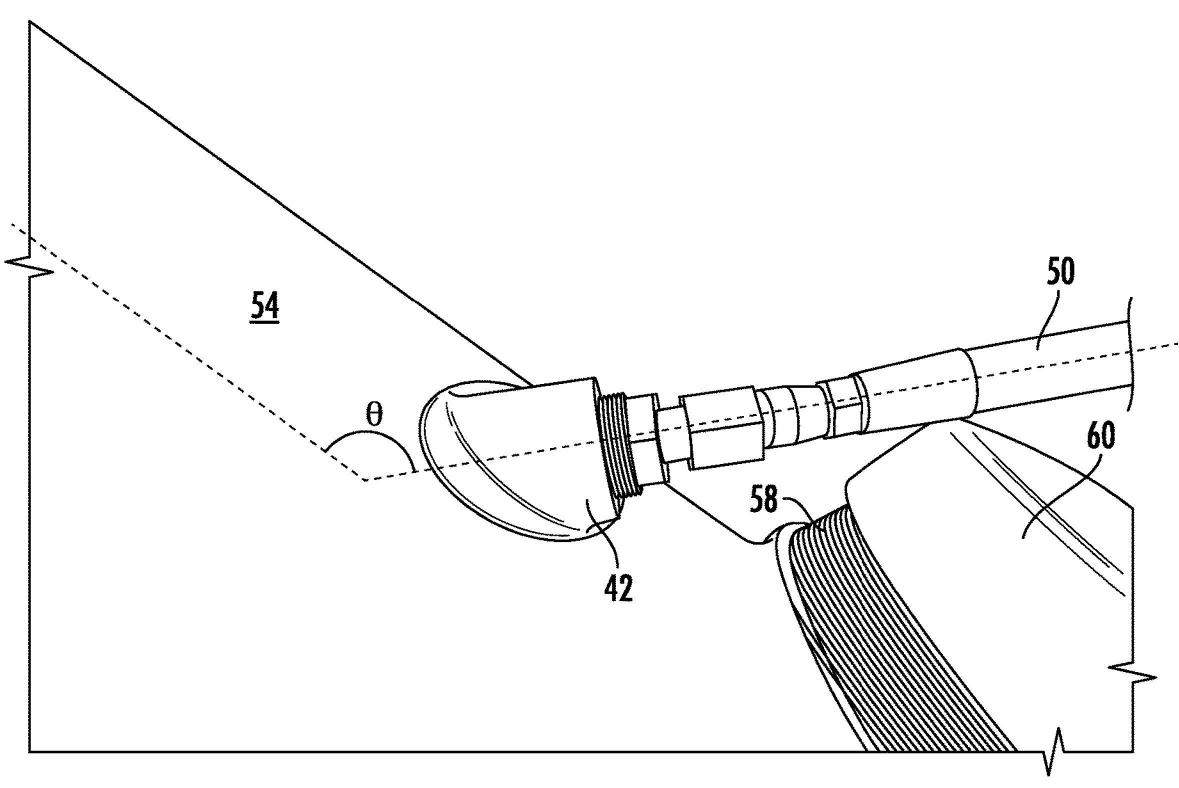
FIG. 5 is a perspective view of another portion of the remediation apparatus constructed in accordance with the present disclosure.

Referring now to FIG. 5, the nozzles 42, or jets of fluid created by the nozzles 42, can be positioned at any angle (θ) relative to an outside surface 54 of the chamber 32 to help force the soil solution through the chamber 32 (i.e., from the soil inlet to the soil outlet). In one embodiment, the nozzles 42 can be positioned from about 30 degrees to about 70 degrees relative to the outside surface 54 of the chamber 32. In another embodiment, the nozzles 42 can be positioned from about 45 degrees to about 60 degrees relative to the outside surface 54 of the chamber 32. In an even further embodiment, the nozzles 42 can be positioned about 55 degrees relative to the outside surface 54 of the chamber 32.

Figure 6A:
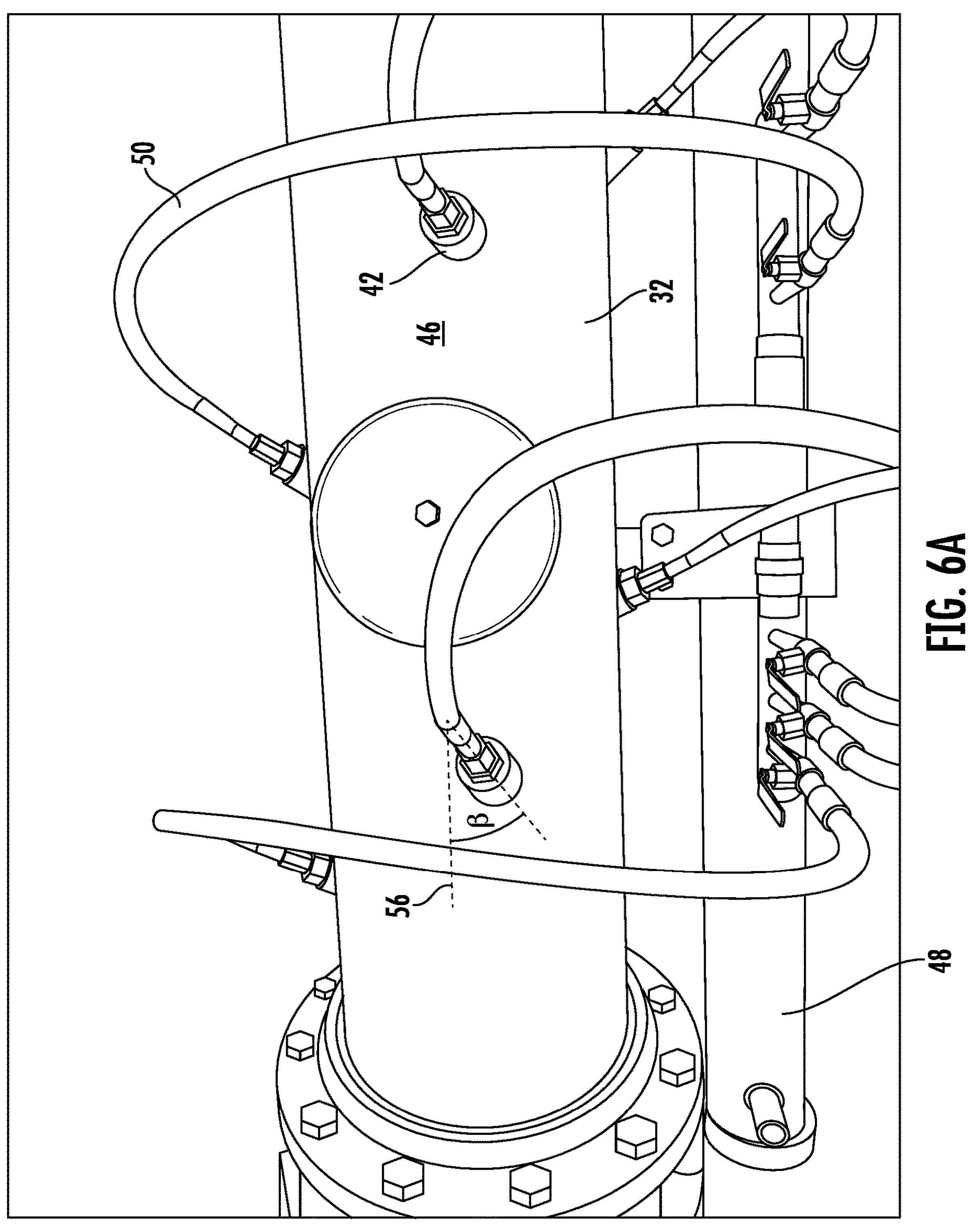
FIGS. 6A and 6B are perspective views of various other portions of the remediation apparatus constructed in accordance with the present disclosure.
Figure 6B:
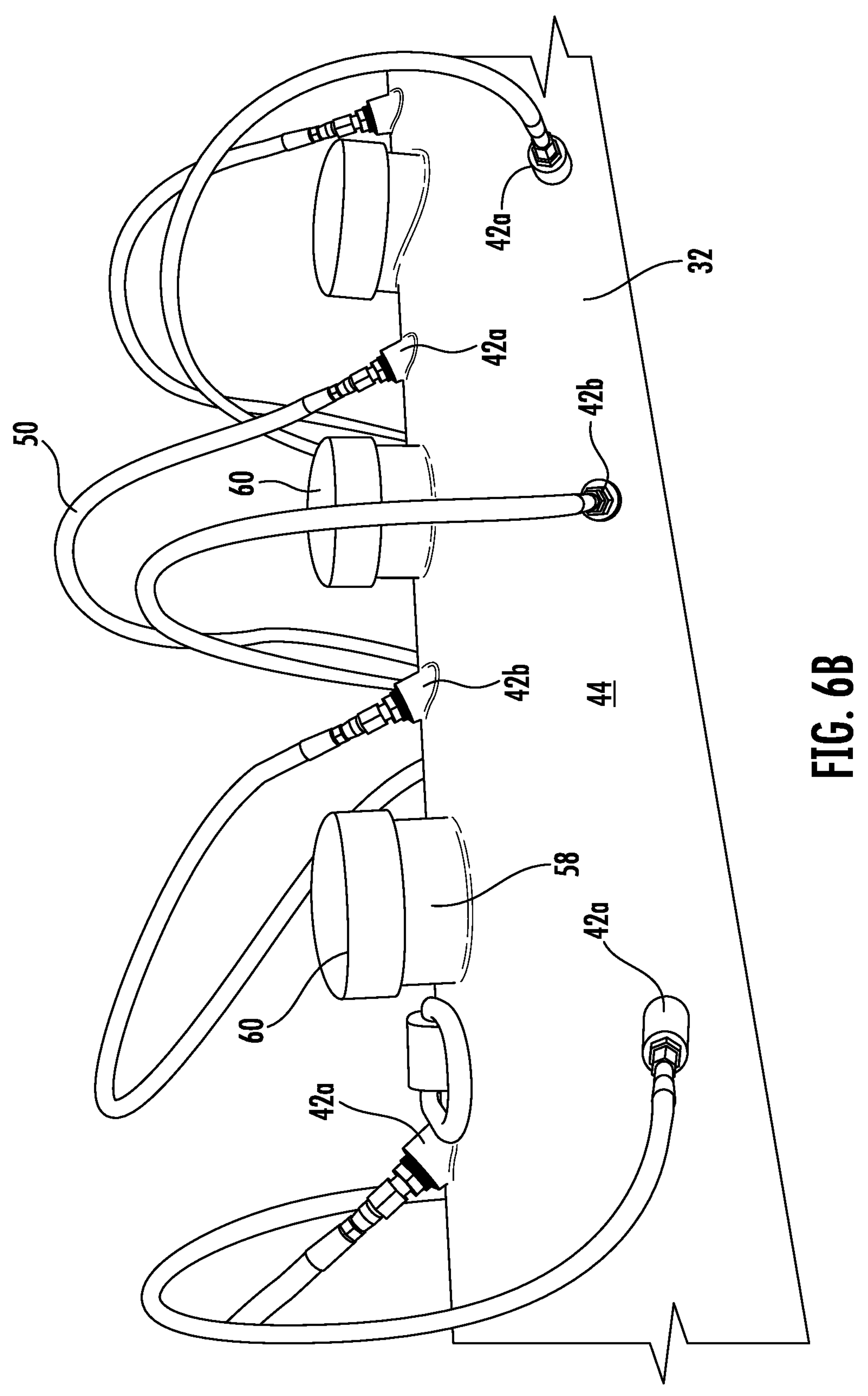

To cause the vortical flow of the soil solution in the chamber 32, the nozzles 42, or the jets of fluid created by the nozzles 42, are angled laterally relative to a straight line 56 on the outer surface 54 of the chamber that runs axially down the chamber 32 in line with the nozzle 42. This angle is represented in FIG. 6A by B. The direction the nozzles 42 are angled relative to the straight line 56 determines in what direction the vortical flow of the soil solution in the remediation apparatus 10 flows. In one embodiment, the nozzles 42 are angled laterally from about 25 degrees to about 50 degrees relative to the straight line 56 on the outer surface 54 of the chamber that runs axially down the chamber 32 in line with the angled nozzle 42 at issue. In a further embodiment, the nozzles 42 are angled laterally from about 30 degrees to about 40 degrees relative to the straight line 56 on the outer surface 54 of the chamber that runs axially down the chamber 32 in line with the angled nozzle 42 at issue. In an even further embodiment, the nozzles 42 are angled laterally about 34 degrees relative to the straight line 56 on the outer surface 54 of the chamber that runs axially down the chamber 32 in line with the angled nozzle 42.

The remediation apparatus 10 can also include several openings 58 disposed in the chamber 32 to be able to access the inside of the chamber 32 in case of blockage. The openings 58 can include a lid 60 to provide a selective means for accessing the openings 58 and thus the inside of the chamber 32. The openings 58 can be disposed at any desirable intervals on the any side of the chamber 32. In one embodiment, the openings 58 are disposed on the upper side 46 of the chamber 32.

The present disclosure is also directed to a method of cleaning a contaminated soil using the remediation apparatus 10. The contaminated soil is fed to the remediation apparatus 10. The contaminated soil is mixed with the aqueous cleaning solution to generate the soil solution wherein the soil solution is caused to undergo vortical flow in one direction in the chamber 32 and then caused to undergo vortical flow in another direction in the chamber 32.

From the above description, it is clear that the present disclosure is well-adapted to carry out the objectives and to attain the advantages mentioned herein as well as those inherent in the disclosure. While presently preferred embodiments have been described herein, it will be understood that numerous changes and combinations may be made which will readily suggest themselves to those skilled in the art and which are accomplished within the spirit of the disclosure and claims.

What is claimed is:

1. A method of remediating soil, the method comprising:

feeding a contaminated soil to a remediation apparatus to generate a clean soil, the remediation apparatus includes a cylindrically-shaped chamber having a soil inlet for receiving a contaminated soil and a soil outlet;

mixing the contaminated soil with an aqueous cleaning solution to generate a soil solution;

subjecting the soil solution to vortical flow in a first direction via injection of the aqueous cleaning solution at an angle between 0 and 90 degrees relative to an axis of the chamber;

subjecting the soil solution to vortical flow in a second direction in an opposite lateral direction from the first direction via injection of the aqueous cleaning solution at an angle between 0 and 90 degrees relative to the axis of the chamber; and separating the clean soil from a dirty aqueous solution.

2. The method of claim 1 further comprising the step of alternating the vortical flow back and forth between the first and second directions of vortical flow.

3. The method of claim 1 wherein the remediation apparatus comprises:

a first set of nozzles to inject the aqueous cleaning solution to create a first vortical flow zone in the chamber in the first direction; and a second set of nozzles to inject the aqueous cleaning solution to create a second vortical flow zone in the chamber in the second direction.

4. The method of claim 3 wherein the remediation apparatus can include multiple additional vortical flow zones alternating between the first direction and the second direction.

5. The method of claim 3 wherein the chamber is tubular shaped.

6. The method of claim 3 wherein the chamber is slanted downward at an angle between about 3 and 8 degrees.

7. The method of claim 3 wherein the remediation apparatus can include 35 to 80 vortical flow zones in the chamber.

8. The method of claim 3 wherein the remediation apparatus includes multiple nozzles per vortical flow zone to create the vortical flow in each zone.

9. The method of claim 3 wherein each nozzle is angled relative to an outer surface of the chamber at an angle between about 30 to about 70 degrees.

10. The method of claim 3 wherein each nozzle is angled to contribute to the vortical flow direction of each vortical flow zone, each nozzle is angled relative to a straight line disposed on an outer surface of the chamber that would run axially down the outer surface of the chamber with respect to each nozzle wherein the angle would be between about 25 to about 50 degrees.

11. The method of claim 3 wherein the chamber includes opening and lids to provide access points to inside the chamber.

12. A remediation apparatus used to clean a contaminated soil, the apparatus comprising:

a chamber having a soil inlet for receiving a contaminated soil and a soil outlet;

a first set of nozzles to inject an aqueous cleaning solution to create a first vortical flow zone in the chamber in a first direction, the first set of nozzles angled between 0 and 90 degrees relative to an axis of the chamber; and a second set of nozzles to inject the aqueous cleaning solution to create a second vortical flow zone in the chamber in a second direction in an opposite lateral direction from the first set of nozzles, the second set of nozzles angled between 0 and 90 degrees relative to the axis of the chamber.

13. The apparatus of claim 12 wherein the remediation apparatus can include multiple additional vortical flow zones alternating between the first direction and the second direction.

14. The apparatus of claim 12 wherein the chamber is tubular shaped.

15. The apparatus of claim 12 wherein the chamber is slanted downward at an angle between about 3 and 8 degrees.

16. The apparatus of claim 12 wherein the remediation apparatus can include 35 to 80 vortical flow zones in the chamber.

17. The apparatus of claim 12 wherein the remediation apparatus includes multiple nozzles per vortical flow zone to create the vortical flow in each zone.

18. The apparatus of claim 12 wherein each nozzle is angled relative to an outer surface of the chamber at an angle between about 30 to about 70 degrees.

19. The apparatus of claim 12 wherein each nozzle is angled to contribute to the vortical flow direction of each vortical flow zone, each nozzle is angled relative to a straight line disposed on an outer surface of the chamber that would run axially down the outer surface of the chamber with respect to each nozzle wherein the angle would be between about 25 to about 50 degrees.

20. The apparatus of claim 12 wherein the chamber includes opening and lids to provide access points to inside the chamber.

* * * * *